March 2, 1948.　　　P. M. THORNS　　　2,437,007
HAYING MACHINE
Filed May 4, 1945　　　3 Sheets-Sheet 3

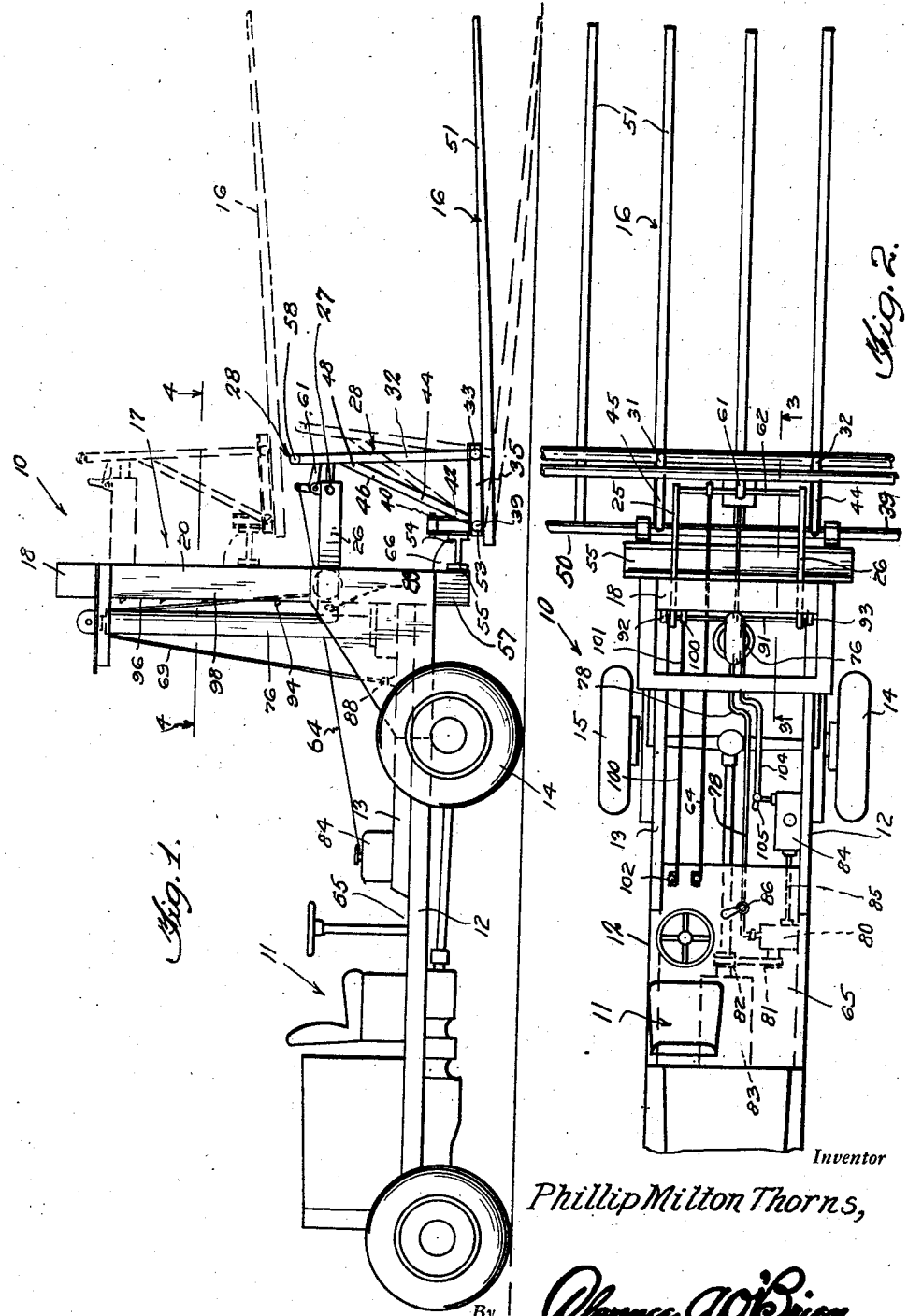

Inventor.
Phillip Milton Thorns,

By Clarence A. O'Brien
and Harvey B. Jacobson
Attorneys

Patented Mar. 2, 1948

2,437,007

UNITED STATES PATENT OFFICE 2,437,007

HAYING MACHINE

Phillip Milton Thorns, Clements, Calif.

Application May 4, 1945, Serial No. 591,949

9 Claims. (Cl. 214—113)

This invention relates to agricultural machines and has for an object to provide a machine for gathering hay from a windrow and delivering it right to a stack or to a barn.

Another object of the invention is to provide a tractor operated rake for picking up a load of hay from a windrow and transporting it directly to a stack and depositing the same thereon.

A further object of the invention is to provide a push or buck rake, transport and stacker of a nature to gather a load of hay in one operation, elevate the same and transport and deposit it directly upon a hay stack or other repository.

A still further object of the invention is to provide the combination of a truck, a pick up rake and an elevator for raising the rake for transportation with its load.

Other features and advantages will become more readily apparent from the following description and the accompanying illustrative drawings in which:

Figure 1 is a side elevational view of my haying machine,

Figure 2 is a plan view thereof, shown partly broken away,

Figure 3:
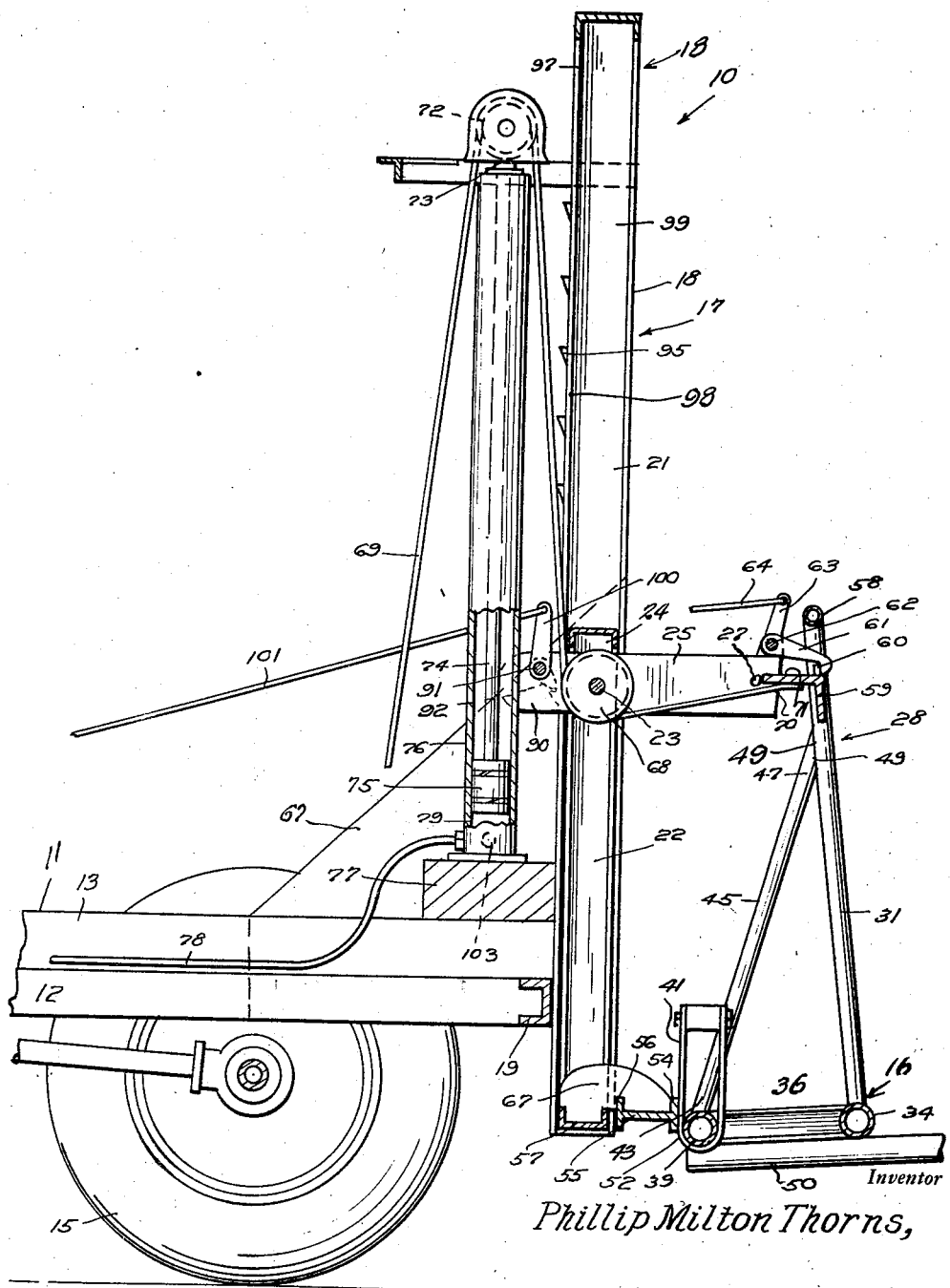
Figure 3 is an enlarged sectional view taken on line 3—3 of Figure 2.
Figure 4:
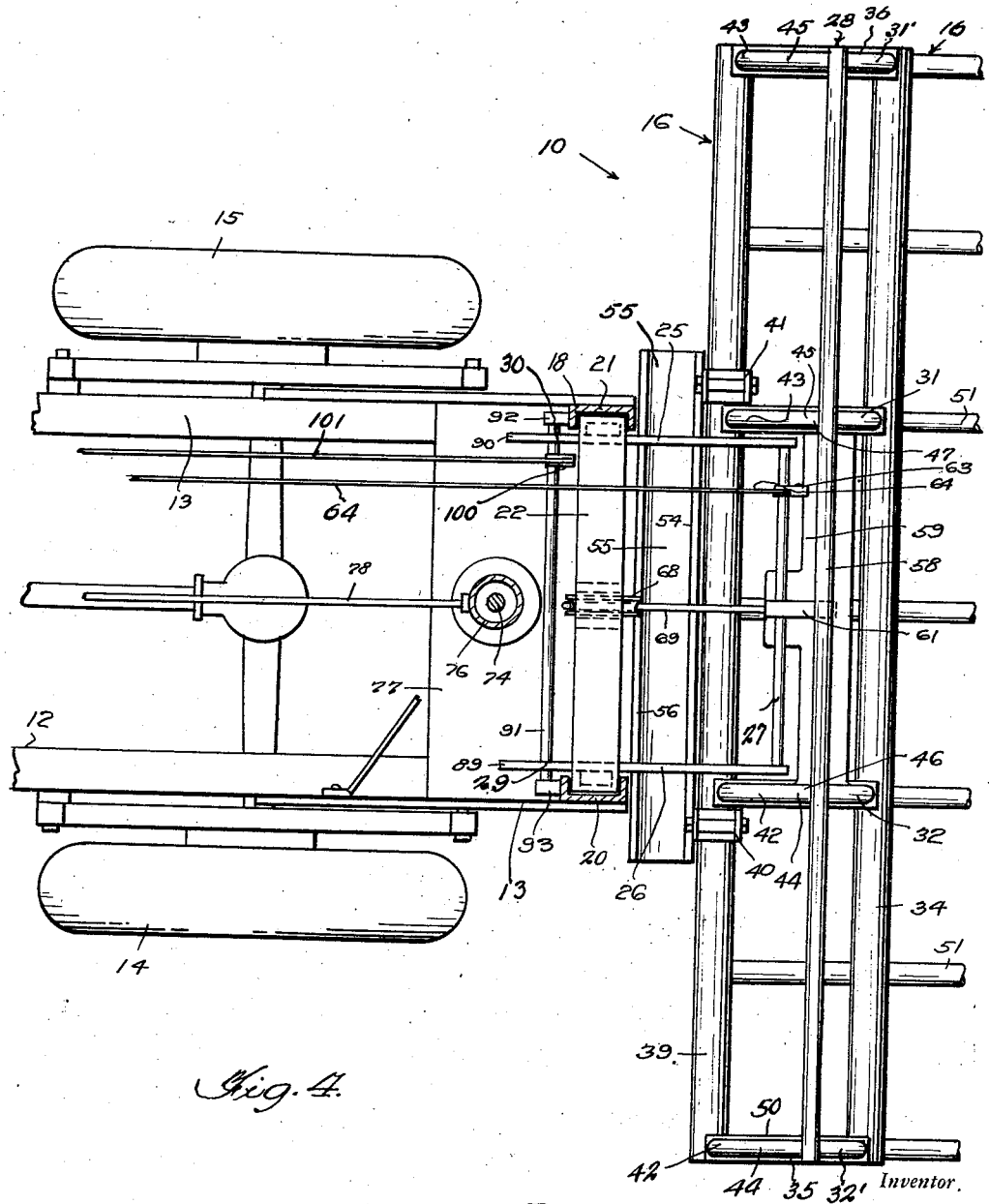
Figure 4 is an enlarged sectional elevation taken on line 4—4 of Figure 1.

In the several views in the drawings and in the following specification the same reference characters indicate like parts and in which 10, is a haying machine which comprises a push tractor or truck body 11, to the chassis 12, of which I attach a supporting frame 13, which projects forwardly of the front drive wheels 14 and 15, a buck rake 16, and upon which is supported an elevator 17.

The elevator includes an inverted U-shaped channel iron trackway 18, vertically mounted upon the forward end 19, of the chassis 12, and within the channels 20 and 21, of which operates a lift 22, also formed of channel iron of a size to suitably fit the trackway. A shaft 23, is carried at the upper end 24, of the lift upon which is mounted a pair of spaced apart arms 25 and 26, connected at their outer ends by a cross rod 27, which forms a stop to limit the rearward movement of a rake support 28. The rear ends 29 and 30, of the arms 25 and 26, extend rearwardly of the member 18, for a purpose presently to be explained.

The member 28, comprises uprights 31 and 32, mounted upon the outer ends 33 connected by a forward transverse bar or pipe 34, of end or link members 35 and 36, the inner ends 37 and 38, of these links being supported upon a transverse bar or pipe 39, supported in elongated U-shaped bearings 40 and 41, and connected to bar or pipe 34 by ends 35 and 36 to form an elongated rectangular frame. The lower ends 42 and 43, of braces 44 and 45, are supported upon the member 39, and their upper ends 46 and 47, are attached to the members 31 and 32, as indicated at 48 and 49. To the bottom of member 28, the inner end 50, of the rake 16, is fixed. Normally the weight of the buck rake 16, will overbalance member 28, so that the forward ends of the tines 51, thereof will rest upon the ground upon which the machine is operating. The purpose of the U-bearings 40, and 41, is to permit the rake to ride smoothly over rough surfaces, as the member 39, may readily raise and lower in conformity with the surface or obstacles which may be in the path of the rake.

The lower ends 52 and 53, of said U-bearings 40 and 41, are each welded, or otherwise fixedly secured to the head 54, of an I-beam 55, the other head 56, of which is similarly affixed to the lower end 57, of the lift 22. The upper ends of members 31 and 32, are connected by a cross bar 58, and further down said uprights are connected by an angle cross member 59, which member is provided with flanges 60, engageable by dogs 61, fixed upon a shaft 62, having a fixed crank arm 63, operable by means of a cable 64, leading to the driver's control platform 65. The shaft 62, is mounted upon the arms 25 and 26, of stop 27. Bracing webs 66 and 67, are welded to the members 22 at 57, 20 and 21, for a more secure connection of the rake 16, with the lift.

Rotatably mounted upon shaft 23, of the lift is a sheave 68, over which a cable 69, is trained, the end 70, of which cable is fixed to the angular extension 71, of member 59. The cable is also trained over a sheave 72, carried on the outer end 73, of a piston rod 74, operated by a piston 75, operating in the elongated cylinder 76, mounted upon a base 77. The piston 75, is hydraulically operated from a supply pipe 78, leading into the lower end 79, of said cylinder 76, and from a pump 80, driven by a belt 81, from a power take-off pulley 82, of the tractor motor 83. Water for operating piston 75, is supplied from a tank 84, connected by pipe 85, to the pump 80. A hand controlled valve 86, is provided in the pipe 78, whereby the piston 75, may be controlled. The end 87, of the cable 69, is secured at 88, whereby when the valve 86, is turned on and the pump 80, operating the water forced into the cylinder 76, raising the piston, its rod 74 and the sheave 72, and with it the cable 69, sheave 68 and through the shaft 23, raise the lift 22, and carry up therewith the rake 16, together with its load, if loaded, the action of the cable upon the member 71, will be to draw the same inwardly and thus tilt the rake toward the truck, whereby the load on the rake will be maintained.

Mounted in the inwardly projecting ends 89 and 90, is a shaft 91, upon which are fixed dogs 92 and 93, adapted to engage the stop teeth 94 and 95, struck out from the side walls 96 and 97, of the arms 98 and 99, of the member 18. Fixed to and adapted to operate shaft 91, is a crank arm 100, to which is attached a cable 101, connected to an actuating lever 102, whereby, by throwing the dogs into engagement with the teeth 94 and 95, the lift 22, may be held at any desired height upon the member 18. When cable 64, is drawn rearwardly by a similar lever to release dogs 61, the rake will drop downward into a forwardly inclined position and dump its load if contained thereon. A water return outlet 103, is provided in the cylinder 76, to which outlet is connected a pipe 104, to tank 84, a control valve 105, being provided in said latter pipe.

From the foregoing it is obvious that I have provided a combined hay rake, hay shocker, hay loader, hay transporter and hay stacker, all in one machine. In operation, the machine is driven forward on a windrow, dropping the hay in large shocks, if desired, or completely loading, the relatively very wide and deep rake elevating the same to drive to a hay stack being formed, or to a hay lift and bringing the rake to a proper height let it incline down and then back the machine off, leaving the hay deposited where wanted.

From the experience I have had with my own machine I have found that from thirty to fifty tons of hay can readily be handled in a drive of one mile to barn or stack and through the operation of the machine with one man, thus saving a haying crew of eight to ten men for accomplishing the same work. Furthermore, green hay may be removed from the windrow of a field to be recropped and deposited in windrows elsewhere for curing, thus saving much hay of the second crop.

A yoke 106, connected to the upper end 107, of the member 18, provides support for the upper end 108, of the cylinder 76.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details and parts such as come within the purview of the invention claimed may be resorted to, in actual practice, if desired.

Having now described my invention that which I claim as new and desire to procure by Letters Patent is:

1. In a haying machine including a push or buck rake, transport and stacker, comprising a tractor having a front wheel drive, an upright guide frame supported at the front of the tractor, a lift operable in said guide frame, a rake pivotally and slidably mounted at the lower end of the guide frame to extend forwardly therefrom and adapted for limited pivotal and slidable movement up and down at its pivoted end independently of the lift, means on the tractor for raising and lowering the lift in the guide frame, said rake being adapted for tilting movement downwardly and upwardly at its forward end, an upright member on the rake near its pivoted end, releasable means engageable with said upright member to hold the same in a rearwardly tilted position or to release the same to a downwardly and forwardly tilted position, and means cooperative between the upright member of the rake and the upright frame, to retain the rake in any desired elevated position.

2. A haying machine including a pick-up rake and means for elevating the rake with its load, said means including a front wheel drive truck, and an elevator mounted thereon at the forward end of the truck, said elevator comprising an upright guide frame fixed to the forward end of the truck and extending above and slightly below the same, a lift operable in said upright frame for sliding movement, arms projecting forwardly from the lift, hydraulic means mounted on the forward end of the truck whereby the slide may be raised and lowered, said rake being pivotally mounted at the lower end of the lift to project forwardly therefrom and adapted for limited upward and downward movement at its pivot, an upright support on the pivoted end of the rake, means cooperative between the arms and said upright on the rake, to hold the rake in a rearwardly tilted position, means operable from the truck to release the latter means to permit the rake to move to a forwardly inclined position downwardly, and means cooperative between the upright guide frame and the arms on the lift, to retain the rake in an elevated position.

3. A haying machine including a pick-up rake and means for elevating the rake with its load, said means including a front wheel drive truck, and an elevator mounted thereon at the forward end of the truck, said elevator comprising an upright guide frame fixed to the forward end of the truck and extending above and slightly below the same, a lift operable in said upright frame for sliding movement, arms projecting forwardly from the lift, hydraulic means mounted on the forward end of the truck whereby the slide may be raised and lowered, said rake being pivotally mounted at the lower end of the lift to project forwardly therefrom and adapted for limited upward and downward movement at its pivot, an upright support on the pivoted end of the rake, means cooperative between the arms and said upright on the rake, to hold the rake in a rearwardly tilted position, means operable from the truck to release the latter means to permit the rake to move to a forwardly inclined position downwardly, projections on the upright frame, catches on the arms of the lift to engage said projection to hold the rake in a desired elevated position when raised, and means operable from the truck to release said catches to permit lowering of the rake.

4. A haying machine including a pick-up rake and means for elevating the rake with its load, said means including a front wheel drive truck having a chassis, and a hydraulic elevator mounted on the forward end of the chassis, said elevator including a slide member and an upright guide frame having tracks within which said slide member may be moved vertically up and down, hydraulic means for operating said elevator and slide, said rake being pivotally and slidably mounted in forwardly offset position at the lower end of the slide member at the bottom of the tracks for forwardly and rearwardly tilting and vertical sliding movements independently of the slide member when in a lowered position, an upright member rigid with the rake at the pivoted end thereof, said rake being normally tilted forwardly, means for tilting the rake in a reverse direction to raise the forward end thereof, releasable means to hold the rake in the last named position, and releasable means to hold the slide member and rake in an elevated position at different elevations.

5. A haying machine including a pick-up rake and means for elevating the rake with its load, said means including a front wheel drive truck having a chassis, and a hydraulic elevator mounted on the forward end of the chassis, said elevator including a slide member and an upright guide frame having tracks within which said slide member may be moved vertically up and down, hydraulic means for operating said elevator and slide, said rake being pivotally mounted upon the lower end of the elevator at the bottom of the tracks forwardly and rearwardly tilting movements when in a lowered position, an upright member rigid with the rake at the pivoted end thereof, said rake being normally tilted forwardly, means for tilting the rake in a reverse direction to raise the forward end thereof, releasable means to hold the rake in the last named position, a cable connected to the slide member for raising the same and the rake therewith, cross arms extending longitudinally of the upper end of the slide member supporting said upright engaging means of the rake and releasing means therefor, said hydraulic means consisting of a cylinder supported on the forward end of the truck in rear of the tracks, a piston therein having a piston rod extending above the upper end of the cylinder, a sheave fixed to the upper end of the piston rod and a cable anchored to the forward end of the truck and extending over the sheave and having its opposite end anchored to the slide at the cross arms thereof whereby to raise and lower the rake upon the piston being moved upwardly and downwardly.

6. A haying machine including a pick-up rake and means for elevating the rake with its load, said means including a front wheel drive truck having a chassis, and a hydraulic elevator mounted on the forward end of the chassis, said elevator including a slide member and an upright guide frame having tracks within which said slide member may be moved vertically up and down, hydraulic means for operating said elevator and slide, said rake being pivotally mounted upon the lower end of the elevator at the bottom of the tracks for forwardly and rearwardly tilting movements when in a lowered position, an upright member rigid with the rake at the pivoted end thereof, said rake being normally tilted forwardly, means for tilting the rake in a reverse direction to raise the forward end thereof, releasable means to hold the rake in the last named position, means for raising and tilting the rake rearwardly, said rake having an upright frame thereon adjacent the pivoted end and adapted for pivotal movement therewith, slotted guides for said pivoted end permitting compensating up and down movements of the rake at said end, means for releasably holding the rake in a rearwardly tilted position, and means for actuating said elevator through the medium of said hydraulic means.

7. A haying machine including a front wheel drive truck, a chassis extending beyond the front drive wheels thereof, an elevator mounted on said chassis and a hydraulic lift for the elevator mounted upon the chassis rearwardly of the elevator, a rake pivoted at its rear end for forwardly and rearwardly tilting movement and for limited vertical movement with respect to the elevator, said rake adapted to move up and down with said hydraulic lift, means for connecting the rake to the elevator at the top and bottom thereof, means mounted upon the truck by which said lift is operated, an inverted U-shaped channel member fixed to the forward end of the chassis and in which said elevator slides up and down, a cross member supported in an elevated position above the rake at its pivoted end and rigid therewith, means for releasably engaging said cross member to hold the rake in a rearwardly tilted position or permit it to drop by gravity to a forwardly tilted position, and means for supporting the rake in an elevated position, said latter means being releasable from the truck.

8. In a haying machine including a push or buck rake, a transport and stacker, comprising a tractor having a front wheel drive, an upright guide frame supported at the front of the tractor, a lift operable in said guide frame, a rake pivotally and slidably mounted in a forwardly offset position at the lower end of the lift to extend forwardly therefrom and adapted for limited pivotal and slidable movement up and down at its pivoted end with respect to the lift, means on the tractor for raising and lowering the lift in the guide frame and the rake therewith, said rake being adapted for tilting movement downwardly and upwardly at its forward end, an upright member on the rake near its pivoted end, means to hold the upright member in a rearwardly tilted position when raised or lowered or to release the same to a downwardly and forwardly tilted position, and means cooperative between the upright member of the rake and the upright frame to retain the rake in any desired elevated position.

9. In a haying machine including a push or buck rake, transport and stacker, comprising a tractor having a front wheel drive, an upright guide frame supported at the front of the tractor, a lift operable in said guide frame, a support fixed to the lower end of the lift and forwardly offset therefrom, short vertical guide bearings mounted at the front of the support a rake pivotally mounted in said bearings to pivot and ride up and down therein, and to extend forwardly therefrom, means on the tractor for raising and lowering the lift in the guide frame and the rake therewith, said rake adapted to ride up and down in the bearings to permit the rake to ride smoothly over rough surfaces, an upright member on the rake near its pivoted end, releasable means engageable with said upright member to hold the same in a rearwardly tilted position when raised or lowered or to release the same to a downwardly and forwardly tilted position, and means cooperative between the upright member of the rake and the upright frame to retain the rake in any desired elevated position.

PHILLIP MILTON THORNS.

REFERENCES CITED

The following references are of record in the file of this patent:

UNITED STATES PATENTS

| Number | Name | Date |
| --- | --- | --- |
| 2,220,450 | Howell | Nov. 5, 1940 |
| 2,273,359 | Johnson | Feb. 17, 1942 |
| 2,295,895 | Duden | Sept. 15, 1942 |
| 2,305,967 | Johnson | Dec. 22, 1942 |
| 2,323,605 | Johnson | July 6, 1943 |
| 2,342,934 | Grundon et al. | Feb. 29, 1944 |
| 2,349,352 | Johnson | May 23, 1944 |
| 2,357,548 | Randall | Sept. 5, 1944 |
| 2,372,870 | Willrodt | Apr. 3, 1945 |
| 2,381,729 | Dunham et al. | Aug. 7, 1945 |
| 2,386,519 | Wagner et al. | Oct. 9, 1945 |
| 2,394,458 | Lull | Feb. 5, 1946 |
| 2,405,312 | Mandt | Aug. 6, 1946 |